United States Patent
Wright et al.

(10) Patent No.: US 6,663,685 B2
(45) Date of Patent: Dec. 16, 2003

(54) FILTER ASSEMBLY

(75) Inventors: Kenneth Wright, Whickham (GB); Brian Lane, Hebburn (GB); Stephen Nicholas Smith, Hilda Park (GB); Paul David Shaw, Moorside (GB); Alan Bateman, South Hylton (GB)

(73) Assignee: Domnick Hunter Limited, Birtley (GB)

(*) Notice: Subject to any disclaimer, the term of this patent is extended or adjusted under 35 U.S.C. 154(b) by 0 days.

(21) Appl. No.: 10/091,212

(22) Filed: Mar. 4, 2002

(65) Prior Publication Data

US 2002/0189216 A1 Dec. 19, 2002

Related U.S. Application Data

(63) Continuation-in-part of application No. 09/581,309, filed as application No. PCT/GB98/03674 on Dec. 14, 1998, now Pat. No. 6,416,563.

(30) Foreign Application Priority Data

Dec. 15, 1997 (GB) ............................... 9726416
Jul. 23, 1998 (GB) ............................... 9815954

(51) Int. Cl.[7] ............................................. B01D 46/24
(52) U.S. Cl. ............................. 55/507; 55/317; 55/322; 55/327; 55/490; 55/509; 55/513; 55/498; 55/502; 55/508
(58) Field of Search ..................... 55/317, 322, 323, 55/327, 490, 493, 507, 509, 513, 498, 502

(56) References Cited

U.S. PATENT DOCUMENTS

| | | |
|---|---|---|
| 3,675,776 A | 7/1972 | Campo |
| 4,063,913 A | 12/1977 | Kippel et al. |
| 4,149,974 A | 4/1979 | Bolton et al. |
| 4,364,757 A * | 12/1982 | Leonatti ........................ 55/509 |
| 4,516,994 A | 5/1985 | Kocher |
| 4,668,256 A | 5/1987 | Billiet et al. |
| 4,848,989 A | 7/1989 | Maeda |
| 5,395,509 A | 3/1995 | Cisneros et al. |
| 5,753,117 A * | 5/1998 | Jiang ............................. 55/497 |
| 5,882,367 A * | 3/1999 | Morgan et al. ................ 55/502 |
| 6,139,607 A * | 10/2000 | Coulonvaux ................. 55/498 |
| 6,409,786 B1 * | 6/2002 | Wright et al. ................. 55/507 |
| 6,416,563 B1 * | 7/2002 | Wright et al. ................. 55/513 |

FOREIGN PATENT DOCUMENTS

| | | |
|---|---|---|
| DE | 37 02 205 A1 | 8/1988 |
| DE | 39 09 402 A1 | 9/1990 |
| EP | 0 197 857 A2 | 10/1986 |
| EP | 0 198 454 A2 | 10/1986 |
| EP | 0 231 862 A2 | 8/1987 |
| EP | 0 278 771 A | 8/1988 |
| EP | 0 547 291 A | 6/1993 |
| EP | 0 578 491 A1 | 1/1994 |
| EP | 0 752 263 A1 | 1/1997 |
| GB | 1 557 946 | 12/1979 |
| GB | 2 126 497 A | 3/1984 |
| GB | 2 250 454 A | 6/1992 |
| GB | 2 261 830 A | 6/1993 |
| GB | 2 295 970 A | 6/1996 |
| GB | 2 307 422 A | 5/1997 |
| WO | WO 88/06228 | 8/1988 |
| WO | WO 90/02597 | 3/1990 |
| WO | WO 94/18387 | 8/1994 |
| WO | WO 96/12547 | 5/1996 |

* cited by examiner

*Primary Examiner*—Duane Smith
*Assistant Examiner*—Minh-Chau T. Pham
(74) *Attorney, Agent, or Firm*—Workman Nydegger

(57) ABSTRACT

A filter assembly for collecting material that is entrained in a gas stream includes a housing for a filter element. The housing has first and second ends with an inlet and an outlet at the first end for the gas that is to be filtered, and a support surface on its internal wall at a point towards its second end. The assembly includes a tubular filter element arranged within the housing for the gas stream to flow through its wall between the inlet and the outlet. The element is located in the housing by way of a support which extends between the filter element at or towards its end and the support surface on the internal side wall of the housing on which the support rests.

32 Claims, 4 Drawing Sheets

FILTER ASSEMBLY

CROSS-REFERENCE TO RELATED APPLICATIONS

This application is a continuation-in-part of U.S. patent application Ser. No. 09/581,309, filed Aug. 28, 2000 now U.S. Pat. No. 6,416,563, which is a U.S. nationalization of International Application PCT/GB98/03674, filed Dec. 14, 1998, which claims priority to United Kingdom Application Serial Nos. 9726416.2, filed Dec. 15, 1997 and 9815954.4, filed Jul. 23, 1998, which for purposes of disclosure are incorporated herein by specific reference.

BACKGROUND OF THE INVENTION

1. The Field of the Invention

This invention relates to a filter assembly for collecting material that is entrained in a gas stream, such as particulate solid material or liquid in an aerosol form, and to a tubular filter element for location in a housing to collect such material.

2. The Relevant Technology

Filtration of gas in a compressed gas system is generally required so that the gas is sufficiently clean for a subsequent application or to minimise adverse effects of impurities on components of the system. For example removal of compressor oil can be required to minimise chemical contamination and accumulation on valves which might lead to malfunction of the valves, and removal of particulate solid material can be required to minimise abrasion.

A known filter assembly for use in compressed gas systems is sold by Domnick Hunter Limited under the trade mark OIL-X. It comprises a housing having inlet and outlet ports for the gas stream that is to be filtered and a tubular filter element which can be located in the housing and is configured for the gas stream to flow through its wall, for example generally outwardly from the inside of the filter element to the outside. When the assembly is used to collect liquid in the gas stream (for example which is carried in the stream as an aerosol), the filter element will cause the liquid to coalesce. Coalesced liquid then drains from the filter element and collects in the housing for discharge. For such applications, the housing will include an outlet for discharge of any collected liquid.

The housing of such a filter assembly comprises a body section in which the filter element is located and in which a reservoir for any collected liquid can be provided, and a head end cap with the inlet and outlet ports for the gas stream. The filter element comprises a filter medium and first and second end fittings by which the filter medium is supported within the housing. The end fitting at the end of the filter element remote from the head end cap is connected to the end cap by means of a tie rod which extends through the tubular cavity within the filter element and engages the end cap by means of a thread. The extension of the tie rod through the filter element and at least partially through the end cap can disturb the flow of the gas stream through filter assembly giving rise to increased flow resistance. This therefore reduces the operating efficiency of the assembly.

SUMMARY OF THE INVENTION

The present invention provides a filter assembly in which a support extends between the filter element at or towards its end and the internal side wall of the housing at a location above the end of the housing remote from the head end cap.

Accordingly, in one aspect, the invention provides a filter assembly for collecting material that is entrained in a gas stream, which comprises:

(a) a housing for a filter element, which has first and second ends with an inlet and an outlet at the first end for the gas that is to be filtered, and a support surface on its internal wall at a point towards its second end, the first and second ends of the assembly defining an assembly axis which extends between the said ends, (b) a tubular filter element arranged within the housing for the gas stream to flow through its wall between the inlet and the outlet, and (c) a support for locating the filter element within the housing, comprising a plurality of fingers which extend between the filter element at or towards its end and the support surface on the internal side wall of the housing, each of the fingers being resiliently flexible so that they can be deformed resiliently when force is applied to the filter element in the direction towards the second end of the assembly.

In another aspect, the invention provides a filter assembly for collecting material that is entrained in a gas stream, which comprises:

(a) a housing for a filter element, which has first and second ends with an inlet and an outlet at the first end for the gas that is to be filtered, and a support surface on its internal wall at a point towards its second end, the first and second ends of the assembly defining an assembly axis which extends between the said ends, (b) a tubular filter element arranged within the housing for the gas stream to flow through its wall between the inlet and the outlet, and (c) a support for locating the filter element within the housing, comprising a plurality of fingers which extend between the filter element at or towards its end and the support surface on the internal side wall of the housing, each of the fingers being inclined to the assembly axis.

The housing has inlet and outlet ports for the gas stream. It can comprise a head end cap and a body section, at least one of the ports for the gas stream being provided in the head end cap. The assembly of the invention has the advantage that flow of gas through the housing head end cap and the internal cavity within the filter element (for example from the inlet to the housing for flow through the filter medium in an outward direction if the assembly operates in an in-to-out mode) is not restricted by a tie rod extending between the bottom end fitting on the filter element into the end cap. It has been found that support for the distal end of the filter element against force applied to it by pressurised gas supplied to the housing head end cap can be provided satisfactorily by a support extending to the side wall of the housing body section, the body section being connected to the end cap. The support can locate the filter element within the housing against force generally along the axis of the filter element, resulting from a pressure differential across the element.

Furthermore, the effectiveness of the seal between the filter element and the housing head end cap is not dependent on the installer of the filter element properly engaging a tie rod in the housing head end cap. By accurate control of the dimensions of the filter element and the components of the housing, the seal can be arranged to be formed reliably when the body section and the head end cap of the housing (with the filter element located inside) are connected to one another.

The present invention therefore enables the operating efficiency of a filter assembly, and the security of the seals in the assembly, to be improved compared with an assembly which uses a tie rod.

Generally, the flow of the gas stream towards and away from the assembly will be generally horizontal. The tubular filter element will generally be arranged vertically so that the housing end cap is arranged at the top of the housing, with the body section depending below it. The support for the filter element will then be located at the lower end of the element.

The filter element will generally comprise a filter medium and first and second end fittings. The support can conveniently provided on one of the end fittings. In particular, it can be preferred for the support and the end fitting to be provided as a single component, possibly as a result of being formed together for example as a single piece moulding, or as a result of being connected to one another for example mechanically, or by bonding (with or without an adhesive material). When the support is provided on one of the end fittings, it will be the bottom end fitting.

Preferably, the fingers of the support are inclined to the axis of the housing, in a direction away from the housing head end cap. For example the angle between the fingers and the said axis can be at least about 45°, preferably at least about 60°, more preferably at least about 75°.

Preferably, the support surface faces axially in the housing, towards the end of the housing from which the filter element is inserted into the housing. The support surface can be provided by a shoulder or ledge on which the filter element support can rest. The support surface can be continuous around the periphery of the housing. It can just be provided at predetermined positions appropriate for engaging the support. A discontinuous support surface can restrict rotation of the filter element relative to the housing. Accurate positioning of the support surface can ensure that the seal between the filter element and the housing head end cap is formed reliably when the body section and the head end cap of the housing are connected to one another.

Preferably, the support comprises at least three limbs which extend between the filter medium and the side wall of the housing. As a result, the filter element is supported stably within the housing, both along and transverse to its axis. The limbs will preferably be narrow when viewed along the axis of the element especially when the filter element is intended to operate in an in-to-out mode in order to minimise accumulation of any coalesced liquid at the base of the filter element. The length and width of the limbs might be such that the limbs appear elongate when viewed along the axis of the filter when they are longer measured transverse to the axis than they are wide measured tangentially to the axis. They might instead have the form of short tabs or tangs when they are shorter measured transverse to the axis than they are wide measured tangentially to the axis.

It can be preferred for the housing to comprise a body section and a base end cap. The support surface on which the support rests can be provided on the end cap. Preferably, the body section and the end cap are open at the interface between them so that the base end cap closes the housing at its lower end. Preferably, the support surface on which the support rests is provided at about the interface between the body section and the base end cap. For example, the support surface might be provided in the base end cap at about the interface with the body section, for example in the form of a shoulder or ledge, provided by an end surface or on an internally projecting rib or a recess.

Generally, the cross-section of the portion of the housing in which the filter element is accommodated tapers relatively little and might even have a substantially constant cross-section. Filter elements such as might be used in the assembly of the invention will generally have an appreciable transverse dimension at their base rather than being tapered to fine point and they might have a generally constant cross-section. Commonly used filter elements are cylindrical.

The body section of the housing in the assembly of the invention is open in the sense that it does not taper significantly between the end of the filter element and its own end (if it extends beyond the end of the filter element) and, in particular, so that coalesced liquid that drains from the filter element does not collect in the body section before draining into the base end cap. Preferably, the body section has a substantially constant cross-section over its length and the housing includes a head end cap which closes the housing at its upper end. The constant cross-section of the body section is such that its cross-section at any two spaced apart points taken on parallel planes are similar and equal figures, apart from features by which the cross-section is specifically modified for example to provide fixation points for other components of the assembly or to provide seals to other components. The constant cross-section is such as might be formed by an extrusion process.

In one embodiment, it is an advantage of the present invention that the body section of the housing can be formed by extrusion, allowing the body section effectively to be formed continuously. The size of a housing can then be selected suit the requirements of a particular application by cutting the body section to an appropriate length. Common end caps can be used for housings with a range of capacities.

Furthermore, the body section can be formed with formations such as ribs or grooves in its wall extending along its length. The formation can be provided with a transverse discontinuity (such as a groove when the formation is a rib) at a longitudinally extending edge thereof, by which the end cap can engage the body section. Details of a housing whose body has a constant cross-section, with a longitudinally extending internal formation and a communicating transverse formation, are disclosed in U.S. patent application Ser. No. 09/581,328 (which claims priority from UK patent applications nos. 9726419.6 and 9815957.7 and which has the same filing and priority dates as the present application). Subject matter that is disclosed in that application is incorporated in the specification of the present application by this reference.

When the filter assembly is intended for use in applications in which liquid impurities are to be collected, the housing preferably includes an outlet at its second end for liquid entrained in the gas stream which coalesces in the filter element. When the housing includes a separable base end cap, it can provide a reservoir into which coalesced liquid can drain from the filter element and which has a valved outlet for discharge of collected liquid from the housing. The reservoir within the housing can provide a "quiet region" in which liquid can collect without excessive turbulence, so that re-entrainment of the liquid is minimised. A valved outlet for coalesced liquid can be provided in the base end cap. The reservoir can be made from a material that is transparent.

The filter medium will be selected according to the requirements on the assembly when in use, for example in terms of the nature and quantity of the impurity (for example as to whether it comprises liquid impurity or solid impurity or both) in the gas stream, the degree of filtration required of the medium, the pressure to which the assembly is exposed when in use. When the impurity to be collected includes liquid (which will generally be present as an aerosol for example of compressor oil), the filter medium will preferably be capable of causing liquid droplets to coalesce. Materials suitable for use in a coalescing filter element are known, including those sold by Domnick Hunter Limited under the trademark OIL-X. Suitable materials include borosilicate and other glass fibers, activated carbon materials, activated silica materials and so on.

Preferably, the housing comprises a head end cap and a body section which can be separated to allow access to the interior of the housing, the support for locating the filter element being provided on the end of the filter element that is remote from the head end cap. When the head end cap and the body section are separated, a filter element within the housing can be inspected and replaced if necessary.

It is preferred that the assembly includes a flow conduit which can be fitted into the head end cap, with one end sealed to a port in the end cap, for directing the flow of gas between a port in the head end cap and the filter medium, especially the tubular cavity within the filter element defined by the filter medium. The connection between the flow conduit and the head end cap might be temporary when separation of the end cap and the flow conduit is required or it might be substantially permanent. The use of a flow conduit which is fitted into the head end cap has the advantage that the flow conduit can be made with a configuration that is not restricted by having to be formed as an integral part of the end cap. For example, when the axes of the openings at the opposite ends of the conduit are not aligned, the flow path between the openings can be configured to present a continuous smooth flow path to the gas stream flowing along it between the first and second conduit openings. The smooth flow path can be constructed to reduce restriction of the flow of the gas stream compared for example with a flow conduit which presents a discontinuous flow path which is sharply angled or contains steps or other obstructions.

The flow conduit can be made with additional features during its manufacture. For example, a port might be formed in it for connection to means for indicating the pressure within the conduit. A tang might be formed on the flow conduit which can be received in a recess in the housing when the flow conduit is properly located within the housing end cap. This can provide an indication that the flow conduit is properly located, for example by visual inspection or as a result of the tang being resiliently deformable and being received in the recess with a snap fit. The flow conduit can be located in its appropriate position within the end cap by means of interengaging ribs on the flow conduit and the end cap respectively.

Details of a filter assembly with a separable flow conduit which is located against a port in a housing by sliding it generally transversely relative to the direction of flow of gas through the port are disclosed in U.S. patent application Ser. No. 09/581,322 (which claims priority from UK patent applications nos. 9726415.4 and 9815961.9 and which has the same filing and priority dates as the present application). Details of a filter assembly in which a flow conduit is located in an end cap of a housing, which also includes a body section for receiving the filter element, are disclosed in U.S. patent application Ser. No. 09/851,321 (which claims priority from UK patent applications nos. 9726415.4 and 9815959.3 and which has the same filing and priority dates as the present application). Subject matter disclosed in those applications is incorporated in the specification of the present application by this reference.

The filter element is located largely within the body section of the housing. Generally, the connection to the filter element for the flow of gases is made at about the interface between the body section and the housing head end cap. However, the filter element might protrude beyond the end of the body section or the body section might extend beyond the end of the filter element. The housing body section and the or each end cap should be capable of being connected to one another with sufficient security to withstand internal pressures to which the assembly is subjected when in use. Examples of appropriate connections include threaded and bayonet type connections.

In one embodiment, the assembly includes means for indicating when the end cap and the body section are connected to one another sufficiently securely to withstand the internal pressures. This can have the advantage of also indicating that the filter element is properly and sealingly connected to the conduit in the end cap through which gas flows between the end cap and the inside of the filter element. The indicating means can also indicate that a flow conduit that is separable from the housing head end cap is appropriately located in its end cap, for example when the flow conduit engages the body section (directly or indirectly) and it is through the action of the body section on the flow conduit that the flow conduit is forced into the housing end cap. The indication can be visual, for example involving the appearance of a marking in the housing or the flow conduit.

The indication can be sensed in other ways, for example by feeling engagement of a resilient member in a recess. For example, one of the flow conduit and the housing can bear a resiliently deformable tang and the other of the flow conduit and the housing can have a recess formed in it in which the tang is received when the flow conduit is properly located within the housing end cap. In a preferred embodiment, the tang is provided on the flow conduit and the recess is provided in the housing end cap.

Preferably, one or both of the end fittings for the filter element are made from a polymeric material such as a polyolefin, a polyamide, or a polyester. The polymeric material can be reinforced for example by fibres. The use of a polymeric material for the end fittings has the advantage that it can conveniently be formed by a moulding process, with the flow conduit or the support for the filter element according to the design of the filter element for any particular application.

It will often be preferred for one, especially both, of the body section and the head end cap of the housing to be formed from a metallic material such as a steel or an aluminium alloy, in particular to enable the housing to withstand the internal pressures to which it is exposed when in use. The end cap will then often be made from a casting process. Polymeric materials can be appropriate for many applications, for example when the filter assembly is only to be exposed to moderate pressures in use or has a small size.

Preferably, the head end cap has at least three ports which are to provide between them the inlet and outlet for the gas that is to be filtered. The provision of at least three ports can enable selection of the relative orientation of the inlet and the outlet by selection of the ports in the end cap that are to provide the inlet and the outlet respectively. The assembly can include an adaptor block having formations in it by which a connection can be made to another component (such as a closure cap for sealing the port against flow of gas, a conduit for the flow of gas to or from the filter assembly, or a connector by which the housing end cap can be connected to a similar port on the housing end cap of another filter assembly), the block and the end cap being capable of being sealingly connected to one another with the block located adjacent to one of the ports of the end cap to provide for flow of the gas stream between the said other component and the said port.

Generally, the flow conduit between the internal cavity in the filter element and a port in the head of the housing (whether or not it is separable from the housing head) will provide a path for the gas stream to flow between the inlet in the housing end cap and the tubular cavity within the filter element for the gas to flow outwardly through the filter medium provided in wall of the element so that the filter element functions in an in-to-out mode. Alternative arrangements are envisaged. For example, the flow conduit can provide a path for the gas stream to flow between the tubular cavity within the filter element and the outlet in the housing end cap after the gas has flowed inwardly through the filter medium, so that the filter element functions in an out-to-in mode.

The filter element comprises a tubular body of filter medium and top and bottom end fittings by which the filter medium is supported within the housing. The flow conduit or the support or both can be provided as part of one of the end fittings of the filter element, especially when the end fitting (including the flow conduit or the support) is formed by a moulding operation.

In another aspect, the invention provides a tubular filter element for location in a housing for collecting material that is entrained in a gas stream by passing the gas stream through the wall of the element which comprises a filter medium, the element comprising first and second end fittings by which connections are formed between the filter element and a housing in which it is located in use, in which:

(a) the first end fitting includes a support comprising a plurality of fingers which extend between the filter element at or towards its end and the support surface on the internal side wall of the housing, each of the fingers being resiliently flexible so that they can be deformed resiliently when force is applied to the filter element in the direction towards the second end of the assembly, and (b) the second end fitting bears a tang which can be deformed resiliently during formation of a connection between the filter element and a housing, and which, when the connection is formed and when the filter element engages the internal side wall of the housing as aforesaid, can be received in a recess in the housing which allows the configuration of the tang to be restored at least partially towards its undeformed configuration.

Preferably, the filter element can be removed from the housing with the support as a one-piece assembly. For example, the support and the end fitting of the filter element can be incorporated into the element as a single component, for example by being manufactured as a single piece (such as by moulding) or by manufacture as a number of pieces which are fastened to one another, for example mechanically or by bonding (with or without an adhesive material).

Preferably, the filter element includes a flow conduit for directing the flow of gas between the tubular cavity within the element (defined by the filter medium) and a port in the head of a housing, the flow conduit being separable from the end cap. Preferably, the filter element can be removed from the housing with the flow conduit as a one-piece assembly. For example, the flow conduit and the end fitting of the filter element can be incorporated into the element as a single component, for example by being manufactured as a single piece (such as by moulding) or by manufacture as a number of pieces which are fastened to one another, for example mechanically or by bonding (with or without an adhesive material).

Preferably, the top end fitting bears a tang which can be deformed resiliently during formation of a connection between the filter element and a housing, and which, when the connection is formed, can be received in a recess in the housing which allows the configuration of the tang to be restored at least partially towards its undeformed configuration. Details of the location of a deformable tang in a recess to indicate proper connection of components of a filter assembly are disclosed in U.S. patent application Ser. No. 09/581,325 (which claims priority from UK patent applications nos. 9726418.8 and 9815955.1 and which has the same filing and priority dates as the present application). Subject matter disclosed in that application is incorporated in the specification of the present application by this reference.

BRIEF DESCRIPTION OF THE DRAWINGS

The present invention will now be described, by way of example only, with reference to the accompanying drawings, in which.

DETAILED DESCRIPTION OF THE PREFERRED EMBODIMENTS

Figure 1:
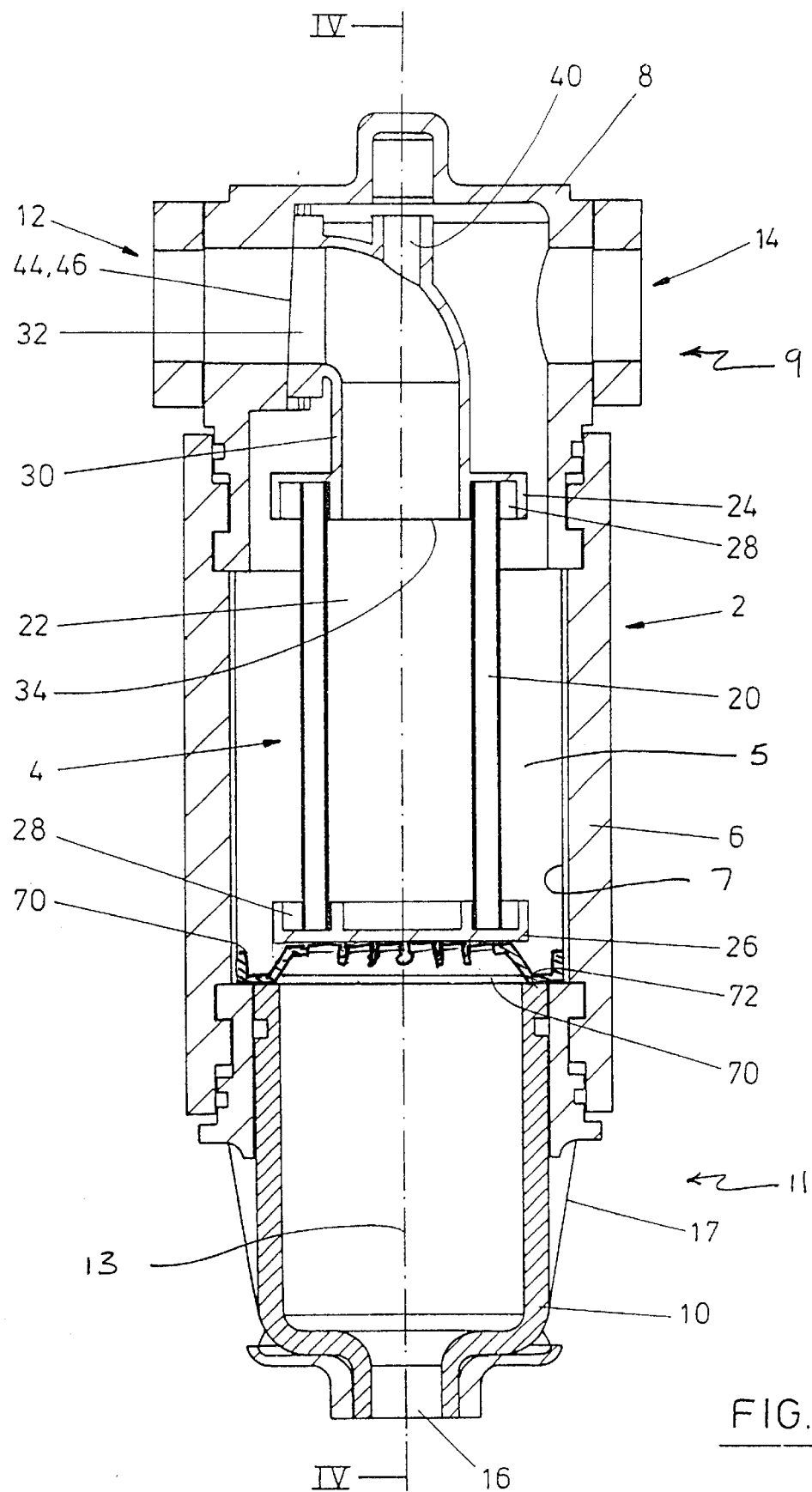
FIG. 1 is a sectional side elevation through a filter assembly according to the invention.
Figure 2:
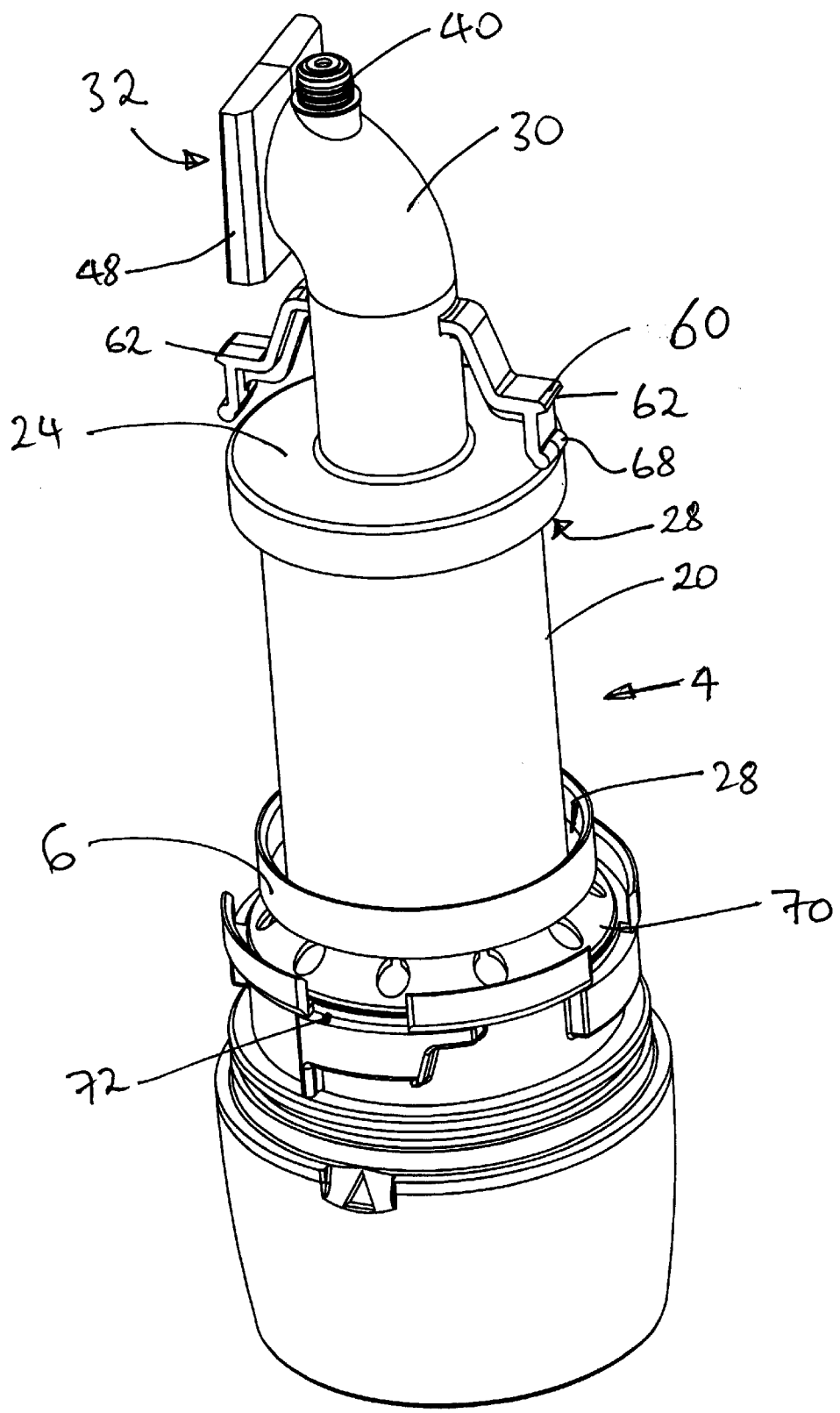
FIG. 2 is an isometric view of the filter assembly without the body section.

Referring to the drawings, one embodiment of the assembly of the invention comprises a housing 2 having a first end 9 and an opposing second end 11. Housing 2 also has an interior surface 7 bounding a compartment 5. A central longitudinal axis 13 (also referred to as an assembly axis) extends through housing 2 between opposing ends 9 and 11. The housing 2 consists of a body section 6, a head end cap 8, and a base end cap 10. A filter element 4 is located wholly within the body section 6 of the housing 2 with the end caps 8 and 10 of the body section 6 extending beyond the ends of the filter element 4.

The head end cap 8 contains an inlet port 12 and an outlet port 14 for a gas that is to be filtered. When the assembly is to be used to collect liquid in a gas stream, the base end cap 10 can provide a reservoir, and can contain an outlet 16 for liquid that has collected in the assembly. It can conveniently be made from a transparent material so that the level of liquid within it can be inspected. It can include a protective cage 17 for the reservoir.

The filter element 4 comprises a cylindrical wall section 20 formed from a filter medium and top and bottom end fittings 24, 26. The wall section 20 defines a cavity 22 within it. The material of the filter medium will be selected according to the nature of the gas to be filtered and the material in it that is to be filtered. When the gas to be filtered contains aerosol droplets of liquid contaminant, the filter medium will be selected to cause the liquid to coalesce. The coalesced liquid within the filter medium will drain through the filter medium and from the filter element. Each of the end fittings has a trough 28 formed in it in which the wall section 20 is received and sealed so as to ensure that flow of fluid through the filter element takes place through the filter medium.

In use, a gas that is to be filtered enters the housing 2 through the inlet port 12 in the head end cap 8 and is directed to the internal cavity 22 within the filter medium by means of a flow conduit 30. The gas flows outwardly through the filter medium. Any liquid in the gas stream can be coalesced within the filter medium. Any solid particles within the gas stream can also be collected by the filter element.

Gas that has passed through the filter medium is discharged from the assembly through the outlet port 14 in the head end cap 8.

The description above applies to the filter assembly when operated in an in-to-out mode. As discussed above, the assembly can instead be configured for use in an out-to-in mode. In each case, connections to the housing end cap for the flow of fluid can be made by means of an adaptor block 90 which can be fitted to the housing head end cap 8 and which bears appropriate formations to make a secure connection to a conduit for the fluid to be filtered or other component.

The head end cap 8 contains the flow conduit 30 by which the flow of gas between the inlet port 12 in the head end cap and the internal cavity 22 within filter medium 20 is directed. The flow conduit 30 has a first conduit opening 32 which is sealed to the inlet port 12, and a second conduit opening 34 which communicates with the internal cavity 22 within the filter medium. In the illustrated embodiment, the angle between the axes of the two openings is about 90°. The flow conduit 30 is gently curved and presents a smooth flow path for a gas stream flowing between the two openings. The flow conduit has a port 40 in it for connection to a gauge for measuring the differential pressure across the filter element. The flow conduit 30 can be formed with its curved shape and integral port and other features by a moulding process, especially when it is formed from polymeric material. The flow conduit can be formed as a one-piece moulding with the top end fitting 24 of the filter element 4.

The inlet port 12 in the head end cap and the corresponding face of the flow conduit present mating planar internal surfaces 44, 46. The opposite edges of the surface 46 on the flow conduit present a pair of ribs 48 which are received between a corresponding pair of ribs presented by the surface 44 on the end cap to retain the sealing surfaces in contact with one another. The ribs 48 on the flow conduit and the ribs on the end cap are aligned with the axis along which the flow conduit is introduced into the housing end cap so that the two sets of ribs engage one another as the flow conduit is introduced. The ribs are tapered so that they have a wedge shape when viewed from the side, to ensure that the mating sealing surfaces 44, 46 on the flow conduit and the housing head end cap are forced together as the flow conduit is introduced into the end cap, to enhance the seal between the surfaces. A sealing gasket 52 is provided in a groove on the surface 46 of the flow conduit around the first conduit opening 32, which is compressed between that surface and the surface 44 on the end cap. The port 40 can be received in a downwardly facing socket in the end cap, forming a seal by compression of a gasket between the internal surface of the socket and the external surface of the port.

Figure 4:
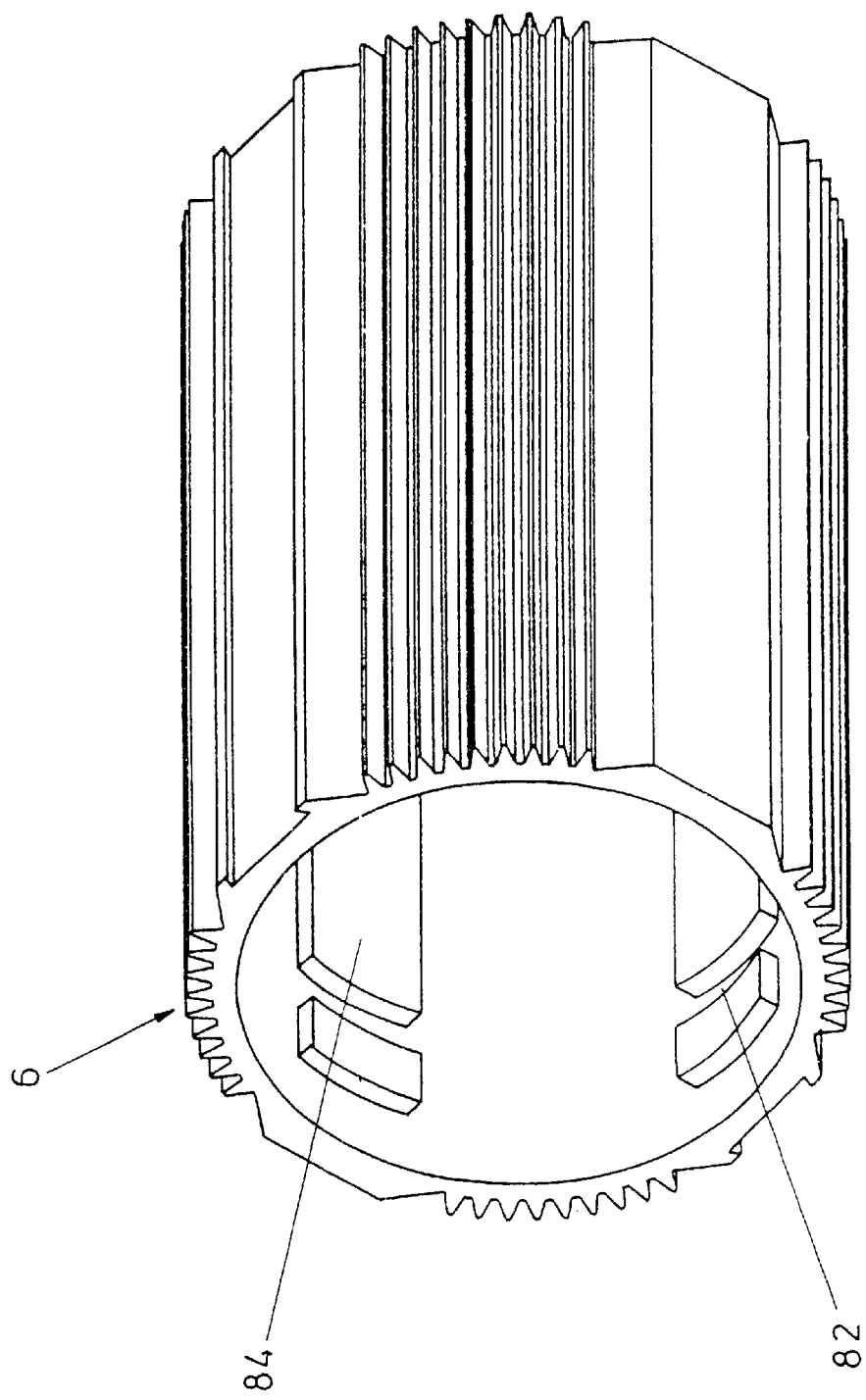
FIG. 4 is an isometric view of the body section of the assembly.

The flow conduit 30 bears two downwardly extending deformable tangs 60. Each tang has an outwardly projecting limb 62 which can be received in a slot 64 in the housing end cap 8 when the flow conduit is properly located in the end cap, as shown in FIG. 4. Location of the limb 62 in the slot 64 is facilitated by a tapered ramp to the slot, causing the tang to be deformed inwardly before springing back into the slot. Once located in the slot, the limb can retain the flow conduit within the end cap, at least until the body section and base end cap of the housing have been connected to the head end cap. The tang 60 also includes a downwardly extending projection 68 by which the tang can be deformed inwardly to release the limb 62 from the slot, allowing the flow conduit to be released from the end cap.

The bottom end fitting 26 includes a circumferential groove in its top surface. The filtration medium 20 fits into the groove 28 where it is bonded to the end fitting so that a seal is formed between them. The lower surface of the bottom end fitting 26 is configured to engage a support 70 which extends between the filter medium 20 and the internal wall of the housing. The end fitting 26 and the support 70 are preferably formed as separate components. Alternatively, bottom end fitting 26 and support 70 can be formed as a single, integral component. The bottom end fitting 26 or the support 70 or both can be manufactured by techniques such as moulding.

Figure 3:
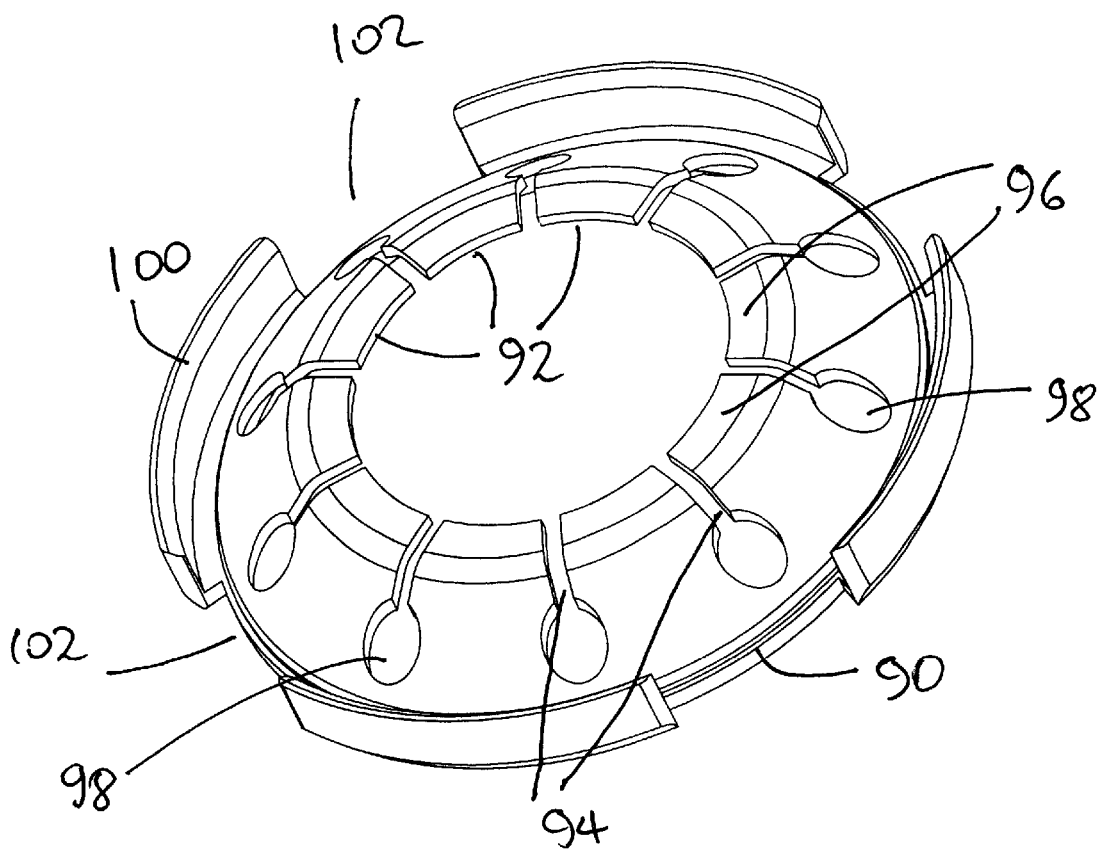
FIG. 3 is an enlarged isometric view of the filter element support part of the assembly.

As shown in FIG. 3, the support 70 comprises a circumferential ring part 90 and a plurality of fingers 92 which extend radially inwardly from the ring part 90. The fingers 92 are separated by slots 94 which are narrow at the inward ends of the fingers 92, but open towards the ring end of the fingers 92 where each of the slots 94 has a rounded, approximately circular shape. The fingers 92 are inclined to the axis of the housing over most of their length, and include a flat portion 96 at their radially inward ends, on which the under surface of the bottom end fitting 26 of the filter element 4 can sit. The outward ends of the slots 94 define a circular opening 98 (close to the circumferential ring part 90 of the support). Preferably, the under surface of the bottom end fitting 26 has a downwardly protruding boss on it which can fit into the circular opening. This can help to locate the bottom of the filter element transversely within the housing 2. In one alternative embodiment, it is appreciated that the ring part 90 can be positioned on the inside end of fingers 92 so that fingers 92 project out from ring part 90. In yet another embodiment, fingers 92 can be connected together at positions between their opposing ends.

The circumferential ring part 90 of the support 70 engages a support surface in the form of an upwardly facing ledge 72 on the base end cap 10 of the housing. When the assembly is assembled with head and base end caps connected to the body section 6 of the housing 2 and the flow conduit 30 within the head end cap, the support provided for the filter element 4 by the support 70 acting on the base end cap retains the flow conduit within the head end cap 8, against the downward force resulting from the differential pressure across the filter medium. The fingers 92 are able to deform resiliently so that, when the parts of the filter assembly are fitted together, the fingers 92 tend to urge the filter element 4 upwardly within the housing 2.

The ring part 90 of the support includes four upstands 100 which help to locate the support 70 laterally within the housing 2. They also provide rigidity for the ring part 90.

The shape of the slots 94 between the fingers 92, with the generally rounded part adjacent to the circumferential ring part, confers advantages in the performance of the assembly. The fingers 92 effectively separate the body section 6 of the housing 2 from the base end cap 10, so that they reduce the level of turbulence in the base end cap 10. This can reduce frothing of liquid in the base end cap 10 and consequent re-entrainment. The rounded openings in the support, adjacent to the circumferential ring part, allow liquid which has collected in the filter element 4 to drain into the base end cap 10. Additional peripheral draining ports can be provided in gaps 102 between the upstands 100. The shape of the slots 94 between the fingers 92 can also provide control over the flexibility of the fingers 92.

The connections between the head and base end caps 8, 10 and the body section 6 of the housing 2 can be made by bayonet arrangements in which four orthogonally arranged lugs 80 on the end caps which are received in transverse grooves within the body section. As can be seen in FIG. 4, each groove 82 is formed in one of four longitudinally extending ribs 84. A detent 86 on at least some of the lugs 80 can retain the lugs and grooves together, preventing inadvertent rotation which would release the end cap from the body section. A similar arrangement of lugs and grooves can be used to form a connection between the base end cap and the body section.

Appropriate seals will be provided between the components of the housing to prevent unwanted loss of pressure.

What is claimed is:

1. A filter assembly for collecting material that is entrained in a gas stream, which comprises:
   (a) a housing having an internal wall at least partially bounding a chamber, the chamber extending between a first end and an opposing second end of the housing, an inlet and an outlet being formed on the housing so as to communicate with the chamber at or toward the first end of the housing, the internal wall of the housing including a support surface at or toward the second end of the housing;
   (b) a tubular filter element disposed within the chamber of the housing, the filter element having a first end located at or toward the first end of the housing and an opposing second end located at or toward the second end of the housing; and
   (c) a support disposed within the chamber of the housing so as to extend between the support surface and the filter element at or toward the second end of the filter element, the support comprising a plurality of fingers, each of the fingers being resiliently flexible such that the fingers deform resiliently when the filter element biases against the support.

2. A filter assembly as claimed in claim 1, wherein the filter element comprises a filter medium and first and second end fittings, the support being a discrete element biasing against one of the end fittings.

3. A filter assembly as claimed in claim 1, wherein the housing has a central longitudinal axis extending between the first end and the opposing second end of the housing, at least a portion of each of the fingers of the support being inclined relative to the central longitudinal axis.

4. A filter assembly as claimed in claim 1, wherein the filter element comprises a filter medium and first and second end fittings.

5. A filter assembly as claimed in claim 4, wherein at least one of the end fittings and the support are formed as a one-piece moulding.

6. A filter assembly as claimed in claim 4, wherein at least one of the end fittings and the support are such that they can be removed from the compartment of the housing as a one-piece assembly.

7. A filter assembly as claimed in claim 1, in which the filter element and the support are separable components.

8. A filter assembly as claimed in claim 1, in which the support comprises a ring part, and in which the fingers depend from the ring part.

9. A filter assembly as claimed in claim 8, in which the ring part is circumferentially continuous.

10. A filter assembly as claimed in claim 8, in which the fingers extend inwardly from the ring part.

11. A filter assembly as claimed in claim 10, wherein a space between any pair of adjacent fingers is larger at one end of the fingers than at the opposing end of the fingers.

12. A filter assembly as claimed in claim 10, wherein a space between adjacent fingers has a wide region close to the ring part and a narrow region at an inner most end of the fingers.

13. A filter assembly as claimed in claim 1, in which the surfaces of the support and the filter element are generally parallel where they are intended to contact one another.

14. A filter assembly as claimed in claim 1, in which the support defines a central opening, and in which the surface of the filter element which acts against the support has a central boss which can be received in the central opening.

15. A filter assembly as claimed in claim 1, in which the housing comprises a body section and a base end cap, and in which the support surface on which the support rests is provided on the base end cap.

16. A filter assembly as claimed in claim 1, in which the housing comprises a body section and a base end cap, and in which the support surface on which the support rests is provided at about the interface between the body section and the base end cap.

17. A filter assembly as claimed in claim 16, in which the body section and the base end cap are both open at the interface between them so that the base end cap closes the housing at the second end thereof.

18. A filter assembly as claimed in claim 1, in which the housing comprises a head end cap and a body section which can be separated to allow access to the chamber of the housing, the support being provided on an end of the filter element that is remote from the head end cap.

19. A filter assembly as claimed in claim 18, which includes a flow conduit within the head end cap for directing the flow of gas between the filter medium and a port in the head end cap, the flow conduit being separable from the end cap.

20. A filter assembly as claimed in claim 1, in which the housing includes an outlet at the second end thereof for liquid entrained in the gas stream which coalesces in the filter element.

21. A filter assembly for collecting material that is entrained in a gas stream, which comprises:
   (a) a housing having an internal wall at least partially bounding a chamber, the chamber extending between a first end and an opposing second end of the housing, an inlet and an outlet being formed on the housing so as to communicate with the chamber at or toward the first end of the housing, the internal wall of the housing including a support surface at or toward the second end of the housing, a central longitudinal axis extending through the housing between the first end and the opposing second end thereof;
   (b) a tubular filter element disposed within the chamber of the housing, the filter element having a first end located at or toward the first end of the housing and an opposing second end located at or toward the second end of the housing; and
   (c) a support disposed within the chamber of the housing so as to extend between the support surface and the filter element at or toward the second end of the filter element, the support comprising a plurality of resiliently flexible fingers, at least a portion of each of the flexible fingers being inclined relative to the central longitudinal axis.

22. A tubular filter element for location in a housing for collecting material that is entrained in a gas stream by passing the gas stream through the wall of the element which comprises a filter medium, the element comprising first and second end fittings by which connections are formed between the filter element and a housing in which it is located in use, in which:

(a) the first end fitting includes a support comprising a plurality of fingers which extend between the filter element at or towards its end and the support surface on the internal side wall of the housing, each of the fingers being resiliently flexible so that they can be deformed resiliently when force is applied to the filter element in the direction towards the second end of the assembly, and (b) the second end fitting bears a tang which can be deformed resiliently during formation of a connection between the filter element and a housing, and which, when the connection is formed and when the filter element engages the internal side wall of the housing as aforesaid, can be received in a recess in the housing which allows the configuration of the tang to be restored at least partially towards its undeformed configuration.

23. A filter element as claimed in claim 22, in which the support comprises at least three limbs which are arranged to extend between the filter medium and the side wall of a housing in which the filter element is to be used.

24. A filter element as claimed in claim 22, in which the end fitting and the support are such that they can be removed from a filter assembly housing as a one-piece assembly.

25. A filter element as claimed in claim 22, in which the end fitting and the support are formed as a one-piece moulding.

26. A filter element as claimed in claim 22, in which the second end fitting includes a flow conduit for directing the flow of gas between the filter medium and a port in a housing in which the element is to be located in use.

27. A filter element as claimed in claim 26, in which the axis of the flow conduit opening which communicates with the housing port and the axis which communicates with the internal cavity in the filter element are not aligned.

28. A filter element as claimed in claim 26, in which the flow conduit is formed as a one-piece moulding with the second end fitting.

29. A tubular filter element for location in a housing, the tubular filter element comprising:

a tubular wall extending between a first end and an opposing second end, the tubular wall being comprised of a filter medium adapted to collect material that is entrained in a gas stream when the gas stream is passed through the wall, a central longitudinal axis extending through the tubular wall between the first end and the second end; and a support mounted on and outwardly projecting from the tubular wall, the support being adapted to bias against the housing when the filter element is disposed within the housing, the support comprising a plurality of resiliently flexible fingers, at least a portion of each of the flexible fingers being inclined relative to the central longitudinal axis.

30. A filter element as recited in claim 29, wherein the support comprises a ring portion having the resiliently flexible fingers projecting therefrom.

31. A filter element as recited in claim 29, wherein the support is fixedly or removably mounted to the tubular wall.

32. A filter element as recited in claim 29, wherein the support is mounted at the first end or the second end of the tubular wall.

* * * * *